July 30, 1935.  A. C. DOBRICK  2,009,607
WASH BASIN FIXTURE
Filed July 21, 1931  2 Sheets-Sheet 1
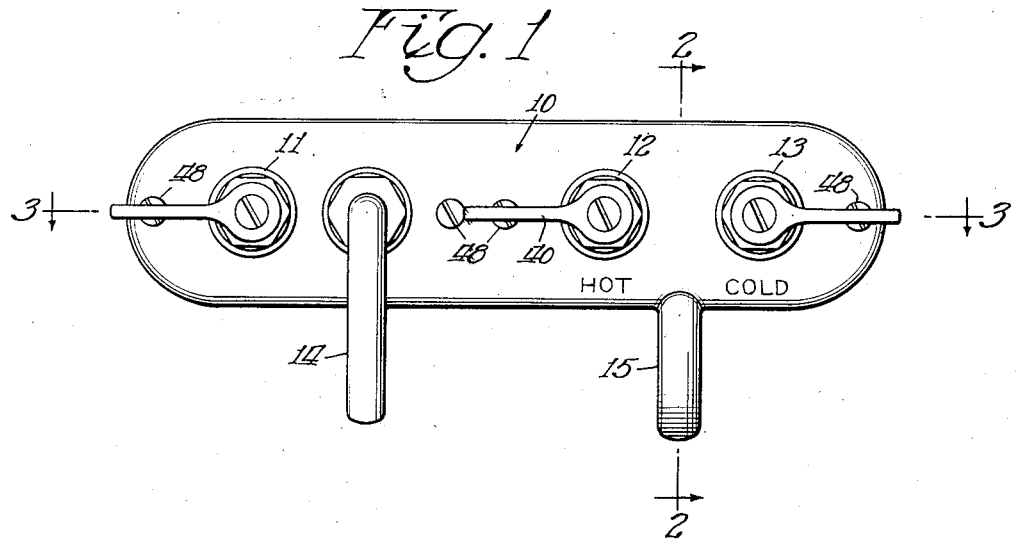
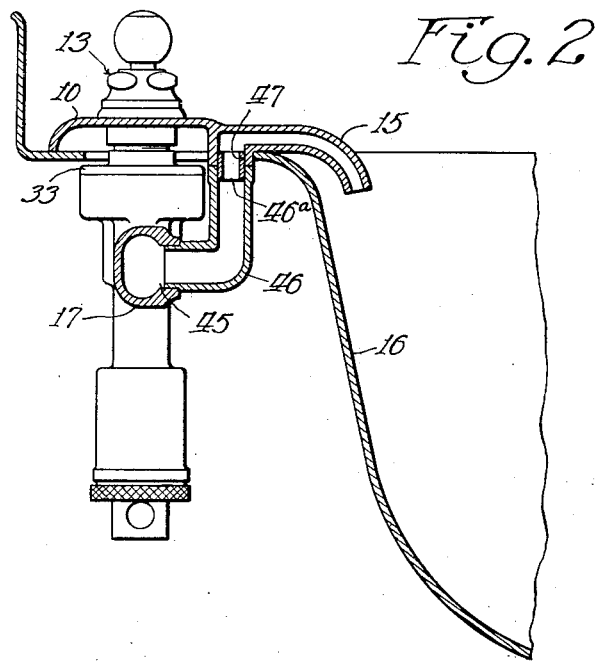
Inventor
August C. Dobrick
By John Howard McElroy
his Atty.

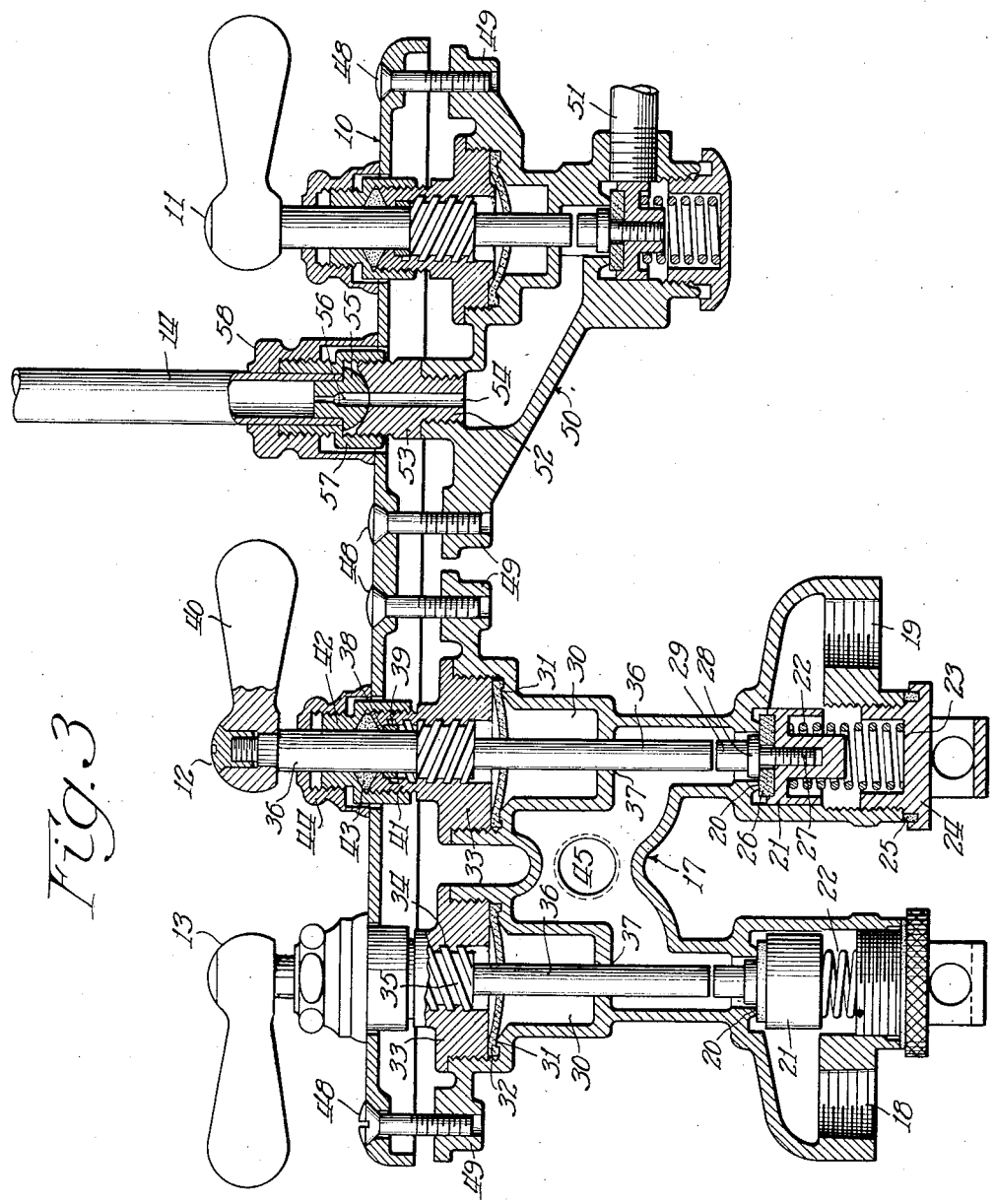

Patented July 30, 1935

2,009,607

UNITED STATES PATENT OFFICE 2,009,607

WASH BASIN FIXTURE

August C. Dobrick, Chicago, Ill., assignor to The Imperial Brass Manufacturing Company, Chicago, Ill., a corporation of Illinois Application July 21, 1931, Serial No. 552,202

4 Claims. (Cl. 137—111)

My invention is concerned with wash basin fixtures, and is designed to produce a simple fixture of the positive actuated type in which the valves will be securely closed even if the cock handle is not turned tightly to its closing position.

To illustrate my invention, I annex hereto two sheets of drawings in which the same reference characters are used to designate identical parts in all the figures, of which,—

Fig. 1 is a top plan view of a fixture embodying my invention;

Fig. 2 is a vertical section on the line 2—2 of Fig. 1; and

Fig. 3 is a vertical section on the line 3—3 of Fig. 1, but on a larger scale.

In illustrating my invention, I have shown it as applied to a fixture having the top plate 10 provided with the cocks 11, 12 and 13 adapted, respectively, for the toothbrush outlet pipe 14 and the hot and cold water discharge pipe 15 which I have shown as projecting from the top plate 10 over the edge of the wash basin 16.

For the hot and cold water cocks, I provide the double-valve casting 17, which will be seen to have the inlet ports 18 and 19, respectively, in the bottom portion thereof, and adapted for the cold and hot water cocks 13 and 12. The casting has therein the two annular valve seat flanges 20 to co-operate with the valves 21 having the annular recesses in their under sides to receive one end of the horizontally-coiled expanding spring 22, the other end of which is received by the recess 23 formed in the bottom of the screw closure 24 threaded into the bottom of the casting and provided with the packing ring 25, as clearly seen in Fig. 3. The valve 21 has seated in the recess, in its upper surface, the leather or other similar washer 26 which forms the actual contact with the valve seat 20, and this is secured in place by the screw 27 threaded into the body of the valve and having the annular shoulder 28 engaging the washer 26 and also the upper end 29 which constitutes an abutment extending up through the valve seat. With the construction shown, it will be obvious that the valve 21 will always be held firmly seated by the action of the spring 22, except when opened as hereinafter described.

The upper end of the casting 17 is provided with the twin recesses 30 which are enlarged at their upper ends and have formed on the shoulder constituting the enlargement the annular flange 31 constituting a seat for the circular washer 32, formed of leather or other similar substance and held in place by the quick-thread nut member 33, which is screwed into the enlarged upper portion of the recess 30 and clamps the periphery of the washer 32 securely between its under surface and the annular flange 31 and prevents any possible leakage around the member 33. This member 33 has the lower portion of the central opening therethrough provided with the quick thread 34 in which is turned the quick-thread member 35 secured on the rod 36, which has its lower end slightly reduced and sliding through a suitable circular aperture 37 in the bottom of the cup-like portion 30. The upper portion of the quick-threaded aperture through the member 33 has the inwardly projecting shoulder 38 which is engaged by the packing ring or washer 39 so located that when the handle 40 attached to the rod 36 is turned to the full open position, the upper edge of the quick-thread screw-member 35 will engage the washer 39 and prevent further upward movement thereof. The reduced upper end 41 of the member 33 is externally threaded and has screwed thereon the packing gland 42, between the internal shouldered portion of which and the top of the portion 41 is placed the packing 43, which serves to prevent leakage of the liquid at the handle.

For ornamental purposes, I preferably thread the exterior of the reduced top of the packing gland 42 and screw thereon the finish cap 44. The handle 40 is secured to the upper end of the rod 36 by any customary detachable connection so that the apparatus can be assembled. The casting 17 contains the outlet aperture 45, and in Fig. 2 I have shown the same as connected to the spout 15 by means of the elbow 46 having one end secured to the outlet 45 and the other end connected by the short internal sleeve 46ª with the inlet 47 to the spout 15. The valve casting 17 is secured to the edge of the basin 16 in any desired manner, as by means of screws 48 passing through the top of the plate 10 and threaded into the lugs 49 formed at the upper end of the casting.

The operation of the apparatus will be readily apparent. With the parts in the position shown in Fig. 3, the valves are held closed by the springs 22, and there is a considerable clearance between the tops of the abutments 29 and the bottoms of the rods 36. It will also be obvious that the handles 40 can be turned around still further before the quick-thread members 35 engage the rings 39. When the valves are to be opened, the handles 40 are swung in the proper direction to carry the rods 36 downward, and when the lost motion is taken up, they engage the abutments 29 and force the valves open, in which position they stay on account of the friction of the screw being too great to be overcome by the upward pressure of the springs 22.

Where the valve is employed for the toothbrush water outlet, I provide the casting 50, which has the inlet port 51 for cold water, and is otherwise constructed the same as the valve used for the hot and cold faucets except that the parts are shortened up somewhat, as clearly shown. The casting is provided with the outlet aperture 52, which has threaded therein the reduced lower end of the connection 53, which has the port 54 therethrough, and its upper end is preferably concaved, as shown, to receive the rounded end of the plug 55 which has the port 56 therethrough, the upper end of which is reduced, as shown, to cut down the possible pressure of the water discharged from the pipe 14, in the lower end of which the plug is secured. The pipe is held in place on the union 53 by the shouldered nut 57, the internal shoulder of which engages the outer edge of the projecting portion of the plug 55 and holds the pipe securely clamped in place. The upper end of the nut 57 is reduced and threaded, and I preferably screw thereon the finish cap 58.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with a support, of a valve casting having an inlet port and an outlet port secured to the support, a valve seat formed in the casting between the two ports, a valve adapted to be seated thereon, a spring co-operating with the valve to hold it seated, an abutment on the valve projecting through the seat to the outlet side, a nut member secured in the casting, a rotatable valve-operating rod having its inner end in its normal position spaced some distance away from the aforesaid abutment, a screw thread on the rod co-operating with the nut, a handle secured on the outer end of the rod, packing for the rod outside of the threaded portion, a vertically disposed union having its reduced lower end screwed into the outlet port, a pipe having a plug with a small aperture therein constituting its inner end seated in the outer end of the union, and a shouldered nut threaded on the outer end of the union and engaging the plug to clamp the pipe in place.

2. In a device of the class described, the combination with a support, of a valve casting having an inlet port and an outlet port secured to the support, a valve seat formed in the casting between the two ports, a valve adapted to be seated thereon, a spring co-operating with the valve to hold it seated, an abutment on the valve projecting through the seat to the outlet side, a nut member secured in the casting, a rotatable valve-operating rod having its inner end in its normal position spaced some distance away from the aforesaid abutment, a screw thread on the rod co-operating with the nut, a handle secured on the outer end of the rod, packing for the rod outside of the threaded portion, a vertically disposed union having its reduced lower end screwed into the outlet port and having its upper end concaved, a plug having a small aperture therein and having its rounded bottom cooperating with the concaved end, and having its reduced upper end secured in the bottom of a pipe with a shoulder projecting beyond the pipe, said pipe, and a shouldered nut threaded on the outer end of the union engaging the sholuder on the plug to clamp the pipe in place.

3. In a device of the class described, the combination with a support, of a valve casting having an inlet port and an outlet port secured to the support, a valve seat formed in the casting between the two ports, a valve adapted to be seated thereon, a spring co-operating with the valve to hold it seated, an abutment on the valve projecting through the seat to the outlet side, a valve-operating rod passing into the casing and having its inner end in its inoperative position spaced some distance away from the aforesaid abutment, means for preventing leakage about the rod, means for reciprocating the rod to open the valve, a vertically disposed union having its reduced lower end screwed into the outlet port, a pipe having a plug with a small aperture therein constituting its inner end seated in the outer end of the union, and a shouldered nut threaded on the outer end of the union and engaging the plug to clamp the pipe in place.

4. In a device of the class described, the combination with a support, of a valve casting having an inlet port and an outlet port secured to the support, a valve seat formed in the casting between the two ports, a valve adapted to be seated thereon, a spring co-operating with the valve to hold it seated, an abutment on the valve projecting through the seat to the outlet side, a valve-operating rod passing into the casing and having its inner end in its inoperative position spaced some distance away from the aforesaid abutment, means for preventing leakage about the rod, means for reciprocating the rod to open the valve, a vertically disposed union having its reduced lower end screwed into the outlet port and having its upper end concaved, a plug having a small aperture therein and having its rounded bottom co-operating with the concaved end and having its reduced upper end secured in the bottom of a pipe with a shoulder projecting beyond the pipe, said pipe, and a shouldered nut threaded on the outer end of the union and engaging the shoulder on the plug to clamp the pipe in place.

AUGUST C. DOBRICK.